United States Patent
Müller et al.

(10) Patent No.: US 9,073,457 B2
(45) Date of Patent: Jul. 7, 2015

(54) VEHICLE SEAT LATCH

(75) Inventors: Peter Müller, Mackenbach (DE); Kadir Yasaroglu, Güzeiyali/Bursa (TR); Volker Windecker, Sippersfeld (DE); Silke Labuk, Weilerbach (DE); Stefan Haber, Pirmasens (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 91 days.

(21) Appl. No.: 13/995,427

(22) PCT Filed: Dec. 17, 2011

(86) PCT No.: PCT/EP2011/006398
§ 371 (c)(1),
(2), (4) Date: Aug. 5, 2013

(87) PCT Pub. No.: WO2012/084172
PCT Pub. Date: Jun. 28, 2012

(65) Prior Publication Data
US 2013/0307307 A1    Nov. 21, 2013

(30) Foreign Application Priority Data
Dec. 20, 2010    (DE) .......................... 10 2010 055 246

(51) Int. Cl.
B60N 2/02    (2006.01)
B60N 2/48    (2006.01)
(Continued)

(52) U.S. Cl.
CPC ........... B60N 2/22 (2013.01); B60N 2002/4455 (2013.01); B60N 2002/4465 (2013.01); B60N 2/3011 (2013.01); B60N 2/2245 (2013.01); B60N 2/366 (2013.01)

(58) Field of Classification Search
CPC ...... B60N 2/206; B60N 2/366; B60N 2/2245; B60N 2/20; B60N 2/3011; B60N 2/433; B60N 2002/4465; B60N 2002/4455
USPC ...... 297/378.13, 378.12, 378.11, 336, 367 R, 297/354.1
See application file for complete search history.

(56) References Cited

U.S. PATENT DOCUMENTS 4,998,758 A * 3/1991 Kowalczyk et al. .......... 292/201
5,398,995 A * 3/1995 Hurite ...................... 297/378.12
(Continued)

FOREIGN PATENT DOCUMENTS

DE    10 2004 051 894 A1    4/2006
DE    10 2005 029 079 A1    1/2007
(Continued)

OTHER PUBLICATIONS

International Search Report received in PCT/EP2011/006398 dated Aug. 1, 2012.
(Continued)

*Primary Examiner* — Chi Q Nguyen
(74) *Attorney, Agent, or Firm* — Foley & Lardner LLP

(57) ABSTRACT

A lock for a vehicle seat has a catch which is pivotable about a catch axis between a release position and a locking position in order to cooperate with a locking bolt or a locking clip of a vehicle structure, and has an ejector. The ejector has a spring element disposed in a housing of the lock. The ejector can be brought into abutment against the vehicle structure or the locking bolt or locking clip by a biased spring element.

13 Claims, 4 Drawing Sheets

(51) Int. Cl.
*B60N 2/22* (2006.01)
*B60N 2/36* (2006.01)
*B60N 2/44* (2006.01)
*B60N 2/30* (2006.01)

(56) References Cited

U.S. PATENT DOCUMENTS

| | | | | |
|---|---|---|---|---|
| 5,904,403 | A * | 5/1999 | Unckrich | 297/378.12 |
| 6,290,297 | B1 * | 9/2001 | Yu | 297/378.12 |
| 6,352,310 | B1 * | 3/2002 | Schmidt et al. | 297/378.12 |
| 6,454,355 | B2 * | 9/2002 | Biletskiy | 297/378.12 |
| 6,481,799 | B1 * | 11/2002 | Whalen | 297/378.11 |
| 6,736,461 | B2 * | 5/2004 | Blair et al. | 297/378.12 |
| 6,910,739 | B2 * | 6/2005 | Grable et al. | 297/378.12 |
| 7,556,315 | B2 * | 7/2009 | Nathan et al. | 297/378.12 |
| 8,454,092 | B2 * | 6/2013 | Thiel | 297/378.11 |
| 2004/0124684 | A1 * | 7/2004 | Bonk | 297/378.12 |
| 2011/0089705 | A1 * | 4/2011 | Barth et al. | 292/226 |

FOREIGN PATENT DOCUMENTS

| | | |
|---|---|---|
| DE | 10 2006 030 732 A1 | 1/2008 |
| DE | 10 2007 016 409 B4 | 10/2008 |
| DE | 10 2008 062 091 A1 | 6/2010 |
| DE | 10 2009 003 671 A1 | 9/2010 |
| EP | 2 020 335 A2 | 2/2009 |
| FR | 2 672 258 A1 | 8/1992 |
| JP | 60-135337 A | 7/1985 |
| JP | 08-258602 A | 10/1996 |
| JP | 2008-114690 A | 5/2008 |

OTHER PUBLICATIONS

International Preliminary Report on Patentability mailed Jul. 4, 2013, as received in corresponding International Patent Application No. PCT/EP2011/006398.

Office Action dated Apr. 1, 2014, received in corresponding Japanese Patent Application No. 2013-530630 along with English translation.

* cited by examiner

US 9,073,457 B2

VEHICLE SEAT LATCH

CROSS REFERENCE TO RELATED APPLICATIONS

The present application is a National Stage of International Application No. PCT/EP2011/006398 filed on Dec. 17, 2011, which claims the benefit of German Patent Application No. 10 2010 055 246.1 filed on Dec. 20, 2010, the entire disclosures of which are incorporated herein by reference.

The invention relates to a latch for a vehicle seat. The invention further relates to a vehicle seat, in particular a motor vehicle seat.

PRIOR ART

A vehicle seat of the type in question and a latch of the type in question are known from DE 10 2008 062 091 A1. The vehicle seat of the type in question comprises a backrest which can be pivoted relative to a vehicle structure from a position for use into a non-use position and which can be locked in the position for use by means of a locking device.

The locking device has a latch which is connected to the backrest and which has a detent which can be pivoted about a detent axis between a release position and a locking position. In the locking position, the detent is in locking engagement with a closure bolt or a curved closure member of the vehicle structure. In the release position, the detent is not in locking engagement with the closure bolt or the curved closure member. When the backrest is in the position for use, the detent is in the locking position thereof.

There is further provided an ejector by means of which the unlocked backrest can be pivoted by a specific extent from the position for use into an ejection position. The backrest can be further pivoted manually from the ejection position into the non-use position thereof.

To this end, the ejector comprises a resilient element which is arranged on the backrest in a housing of the latch. In this instance, the resilient element is constructed as an additional ejection spring which is arranged between the housing of the latch and the detent and which applies an opening moment to the detent. The ejection spring which is constructed as a tension spring therefore constantly acts on the detent in the direction toward the release position.

In the position for use and also in the ejection position, the backrest is inclined by a specific angle with respect to the vertical so that it applies to itself with its inherent weight a torque in the direction toward the position for use.

For example, in a vehicle which is inclined in an upward direction at the front and which is located on an upwardly inclined road, this may lead to the backrest pivoting back into the position for use and being locked again owing to its inherent weight after the locking device has been unlocked and the backrest has been pivoted into the ejection position.

SUMMARY OF THE DISCLOSURE

An object of the invention is to provide a latch for a vehicle seat and a vehicle seat of the type mentioned in the introduction, automatic locking being prevented after the locking device has been unlocked, and a constant action of the resilient element on the detent being prevented.

This object is achieved according to the invention by a latch for a vehicle seat having features described herein. Advantageous embodiments which can be used individually or in combination with each other are described herein.

According to the invention, there is provision for the ejector to be constructed in such a manner that, in particular with the detent in the release position, it can be brought into abutment with the closure bolt or curved closure member by means of a pretensioned resilient element.

Owing to this construction, the ejector keeps the closure bolt or the curved closure member away from the detent so that the detent can no longer automatically move into locking engagement with the closure bolt or the curved closure member. There is also no constant action of the resilient element on the detent.

The housing of the latch may have a slot-like receiving member, one end of which is open in an outward direction and the other end of which is closed with a base, whereby relatively simple introduction of a closure bolt is possible.

For locking with respect to the vehicle structure, the closure bolt can be introduced, transversely relative to the longitudinal extent thereof, into the receiving member and can be engaged round by the detent at its side facing away from the base of the receiving member. Consequently, the closure bolt is secured in the receiving member of the housing of the latch.

Preferably, the ejector has a sliding ejection member which is acted on by the resilient element. Direct contact between the resilient element and the vehicle structure or the closure bolt or the curved closure member is thereby prevented.

According to an advantageous embodiment of the invention, the resilient element is constructed as a pressure spring and is supported on the housing of the latch. The resilient element is clamped in particular between the housing and the sliding ejection member. The structural space required is thereby reduced.

The resilient element is preferably constructed as a cylindrical helical spring, whereby only a small structural space is also required.

If the sliding ejection member has a cylindrical recess, in which the resilient element is fitted, the resilient element is connected to the sliding ejection member in a positive-locking manner and tilting or tipping of the sliding ejection member is prevented.

Tilting or tipping of the sliding ejection member is additionally prevented by the sliding ejection member engaging round a stop at two sides.

Advantageously, the stop is constructed integrally with the housing of the latch and forms the base of the slot-like receiving member. The number of components required is thereby reduced, whereby the assembly complexity is also reduced.

According to an advantageous development, the sliding ejection member comprises two arms with which it engages round the stop. In this instance, one arm is constructed so as to be longer than the other arm and, at one end of the longer arm facing away from the resilient element, there is provided a contact face by means of which the sliding ejection member contacts the closure bolt or the curved closure member. Consequently, the sliding ejection member is guided in the housing in a positive-locking manner and prevented from tilting or tipping.

In order to contact the closure bolt or curved closure member, the longer arm of the sliding ejection member protrudes with the contact face beyond the base into the region of the receiving member.

In this instance, the detent of the latch can be moved into a release position by means of an unlocking device. If the unlocking device can be controlled remotely, with the person initiating the remote control not being located in the region of the vehicle seat, but instead being remote, for example in the region of the luggage compartment, reliable prevention of automatic locking after an unlocking action is particularly important.

This object is also achieved according to the invention by a vehicle seat having features described herein. Advantageous embodiments which can be used individually or in combination with each other are described herein.

The latch may in this instance be constructed, for example, as a backrest latch and may be arranged on a backrest of the vehicle seat which can be pivoted relative to a vehicle structure and which can be locked thereto in the position for use. The closure bolt or curved closure member is fitted to the vehicle structure in this instance.

However, the latch may also be constructed as a base latch and may be arranged on a seat part of the vehicle seat. In this instance, the vehicle seat can be secured to the vehicle structure by means of the latch and, for example, in order to remove the seat from the vehicle or in order to pivot the seat part relative to the vehicle structure, can be released from the vehicle structure. Such a use is disclosed, for example, in EP 1 488 950 A2. The closure bolt or curved closure member is also fitted to the vehicle structure in this instance.

However, it is also conceivable for the latch to be arranged on the vehicle structure and for the closure bolt or curved closure member to be fitted to the backrest or to the seat part or to another part of the vehicle seat.

In a backrest latch, there is in particular provision, when the backrest is in the position for use with the pretensioned resilient element, for the ejector to be in abutment with the vehicle structure or the closure bolt or curved closure member.

Owing to this construction, after the backrest has been pivoted into the ejection position, the detent can no longer automatically move into locking engagement with the closure bolt or the curved closure member. The backrest is then ready to be manually pivoted further into the non-use position. There is also no constant action by the resilient element on the detent.

In order to retain the backrest, a pivot movement of the backrest from the ejection position into the position for use is advantageously counteracted by a force which is applied by the resilient element and which corresponds to or is greater than a force acting on the backrest in the direction toward the position for use owing to the inherent weight of the backrest when the backrest is in the position for use.

The force applied by the resilient element in order to retain the backrest in the ejection position is advantageously so great that, even if the vehicle is strongly inclined, it is greater than the opposing force owing to the inherent weight of the backrest.

Advantageously, the detent is urged toward the release position thereof by means of an additional detent spring. In this manner, when the locked vehicle seat is unlocked, the backrest is moved by the ejector, and additionally by the torque acting on the detent, into the ejection position, and optionally beyond. Consequently, reliability in terms of preventing automatic locking is further increased.

The detent has a functional face by means of which, when the closure bolt or the curved closure member is introduced into the slot-like receiving member of the latch, the detent is pivoted from the release position thereof into the locking position thereof. A torque acts on the detent in the direction toward the locking position.

This torque applied by the closure bolt or the curved closure member is counteracted by a torque from the detent spring in the direction toward the release position. This torque applied to the detent by the detent spring produces a force which urges the backrest from the position for use into the ejection position.

An advantageous division of the two forces, that is to say the force applied by the ejector to the backrest and the force brought about by the detent spring on the backrest, allows these two forces to be minimized.

The detent spring in this instance is advantageously constructed as a rotary leg spring, whereby optimal use is made of the structural space available in the housing of the latch.

BRIEF DESCRIPTION OF THE DRAWINGS

The invention is explained in greater detail below with reference to advantageous embodiments illustrated in the drawings. However, the invention is not limited to these embodiments. In the drawings.

DETAILED DESCRIPTION OF THE DRAWINGS

Figure 1:
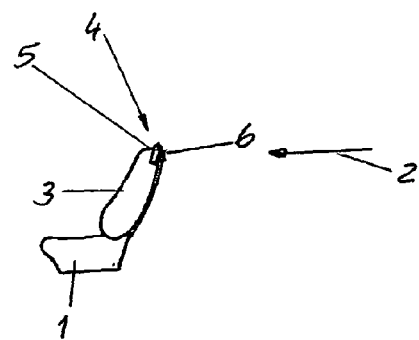
FIG. 1 is a schematic illustration of a vehicle seat.

The vehicle seat illustrated in FIG. 1 has a seat part 1 to the rear end of which, in the travel direction 2, there is articulated a backrest 3 which can be pivoted from the upright position for use illustrated into a non-use position which is directed toward the front of the vehicle.

In the position for use, the backrest 3 can be locked by a locking device 4 which comprises a latch 5 which is arranged at the upper end of the backrest 3 and a closure bolt 7 which is arranged in a fixed manner on a vehicle structure 6 and which extends horizontally and transversely relative to the travel direction 2.

A latch 5 of the type in question is also referred to as a backrest latch and is known, for example, from DE 10 2007 016 409 B4, the disclosure of which is expressly incorporated herein by reference. However, the backrest latch known from DE 10 2007 016 409 B4, in contrast to the subject matter of the application, does not have an ejector.

The latch 5 has a housing 8 which is closed by means of a cover 36. The housing 8 has a slot-like receiving member 9 which is directed substantially horizontally when the backrest is upright and the end of which directed counter to the travel direction 2 is open in an outward direction, and the opposing end of which directed in the travel direction 2 is closed with a base 10.

A first bearing pin 32 supports a detent 12 which can be pivoted about a detent axis 13. In order to co-operate with the closure bolt 7, the detent 12 has a hook-like aperture 14. In a release position, the detent 12 is pivoted in such a manner that the hook-like aperture 14 thereof and the receiving member 9 of the housing 8 are ready to receive the closure bolt 7.

A second bearing pin 34 which is arranged parallel with the first bearing pin 32 supports a catch element 17 and a clamping element 18 which are pivotable in the plane of the detent 12 about a catch element axis 16.

The detent axis 13 and the catch element axis 16 extend parallel with each other.

The detent 12 is acted on by a resilient force of a detent spring 30, whereby a torque which acts on the detent 12 in the unlocking direction is produced. The detent 12 is therefore pretensioned in the unlocking direction thereof. The detent spring 30 is in this case constructed as a rotary leg spring and is arranged around the detent axis 13.

The catch element 17 and the clamping element 18 are each pretensioned in the closure direction thereof by means of a first rotary spring 38 and a second rotary spring 40. The first rotary spring 38 and a second rotary spring 40 are in this instance constructed as rotary leg springs and are arranged around the catch element axis 16.

The catch element 17 and the clamping element 18 are coupled for joint travel with idle travel.

In the locking position of the detent 12, the pretensioned clamping element 18 acts on the detent 12 by means of a clamping face which is curved eccentrically relative to the second bearing pin 34 in order to apply a closing moment to the detent 12. A functional face 11 of the detent 12 co-operates with the clamping face, the angle between the clamping face and the functional face 11 being located outside the self-locking range.

Owing to the backrest 3 being pivoted into its position for use, the closure bolt 7 is moved into the receiving member 9 relative to the backrest 3. In this instance, the closure bolt 7 reaches the hook-like aperture 14 of the detent 12 and moves into abutment with the functional face 11 of the detent 12.

In this instance, the detent 12 is pivoted from the release position into a locking position in which the hook-like aperture 14 extends transversely relative to the receiving member 9, whereby the closure bolt 7 is prevented from moving out of the receiving member 9.

If the closure bolt 7 moves out of the unlocked state into the receiving member 9 and into abutment with the functional face 11, the closure bolt 7 therefore presses the detent 12 into the locking position thereof.

The clamping element 18 moves along the functional face 11 in the same manner as the catch element 17 which is carried by the clamping element 18, whereby these two elements 17 and 18 secure the detent 12 in the locking position thereof.

Figure 2:
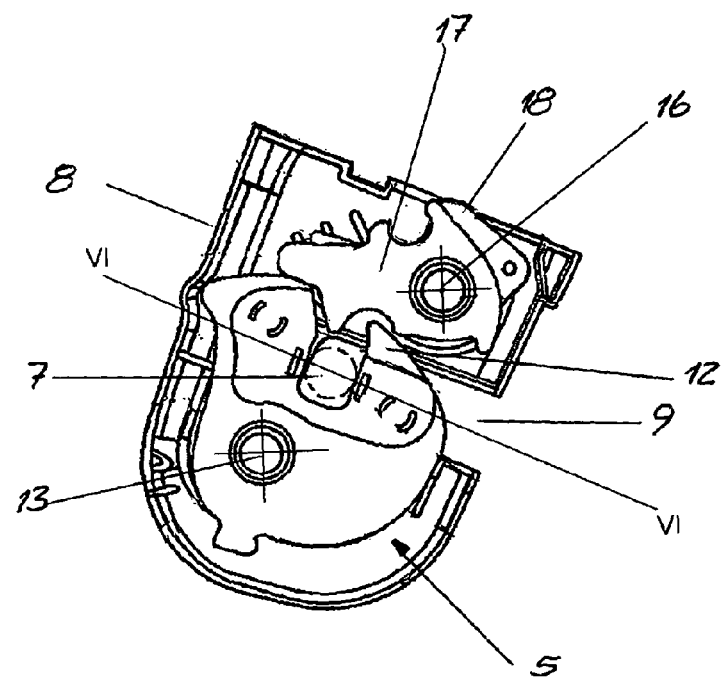
FIG. 2 is a sectioned view of the latch in the locked state.
Figure 3:
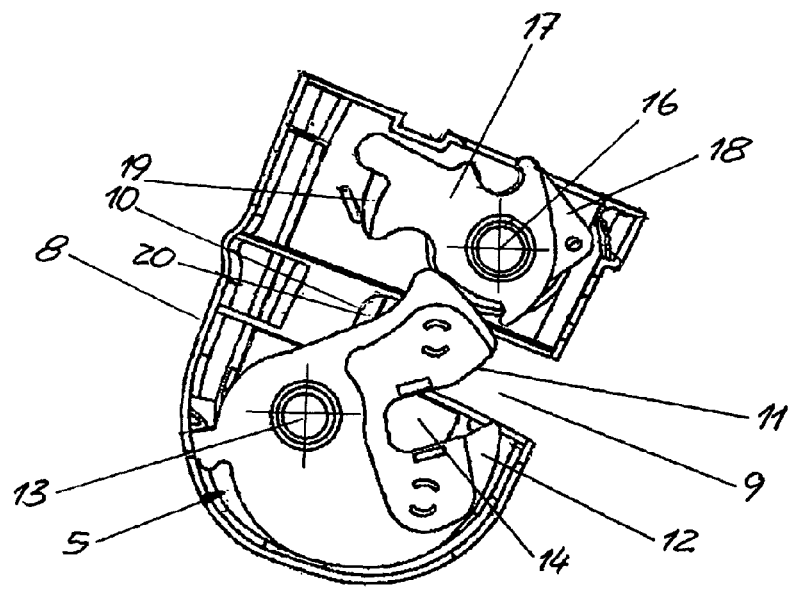
FIG. 3 is a sectioned view of the latch according to FIG. 2 in the unlocked state.
Figure 4:
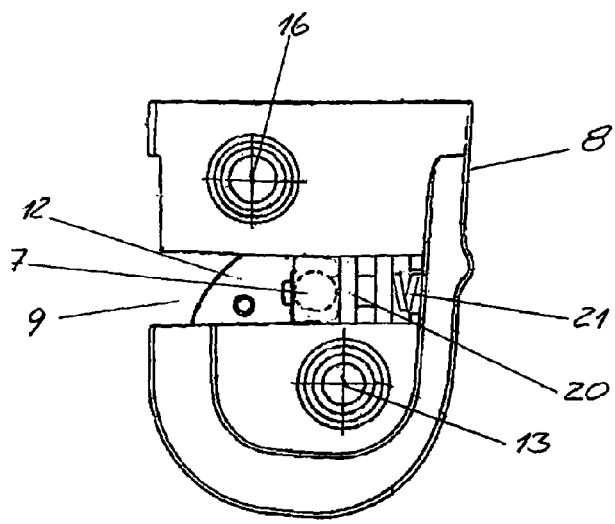
FIG. 4 is a partial view of the latch according to FIG. 2 in the locked state.
Figure 5:
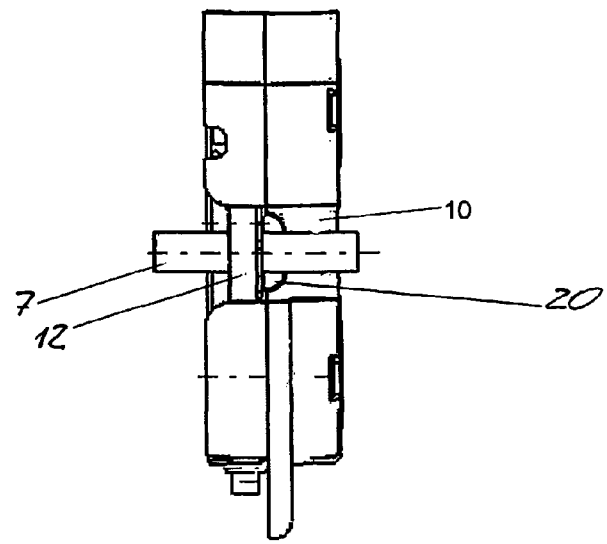
FIG. 5 is a side view of the latch according to FIG. 2 in the locked state.

For unlocking, the catch element 17 is pivoted in a clockwise direction by a remote-controlled drive (not illustrated) according to the illustration in FIG. 2 and FIG. 3, such that a catch face 19 of the catch element 17 moves away from the functional face 11.

The catch element 17 carries the clamping element 18, such that the detent 12 is no longer secured.

There is provided in the housing 8 an ejector 25 which comprises a resilient element 21 and a sliding ejection member 20. The sliding ejection member 20 is displaceably guided in the longitudinal extent direction of the receiving member 9. The resilient element 21 in this instance is constructed as a pressure spring which is supported in the housing 8 and which presses the sliding ejection member 20 in the direction toward the open end of the receiving member 9.

In the release position of the detent 12 and when the closure bolt 7 is not inserted into the receiving member 9, the sliding ejection member 20 protrudes beyond the base 10 into the receiving member 9.

If the backrest is pivoted into its position for use, the closure bolt 7 moving into the receiving member 9, the closure bolt 7 moves into abutment with the sliding ejection member 20 and displaces it counter to the force of the resilient element 21 in the direction toward the base 10. Furthermore, the closure bolt 7 presses the detent 12 into the locking position thereof.

If unlocking is brought about from this locking position, the closure bolt 7 is displaced by the force of the resilient element 21 away from the sliding ejection member 20 toward the opening of the receiving member 9 until the backrest 3 has reached an ejection position and is retained securely at that location owing to the pretensioning of the resilient element 21.

In this ejection position of the backrest 3, the detent 12 can no longer engage behind the closure bolt 7 in a locking manner.

The pretensioning force of the resilient element 21 is so great that, even when the vehicle is inclined, the inherent weight of the backrest 3 cannot move the backrest 3 into the position for use again counter to the force of the resilient element 21, but instead the backrest 3 is initially retained in the ejection position.

Consequently, an automatic backward movement of the backrest 3 in its position for use and locking of the backrest 3 in the latch 5 are reliably prevented.

Figure 6:
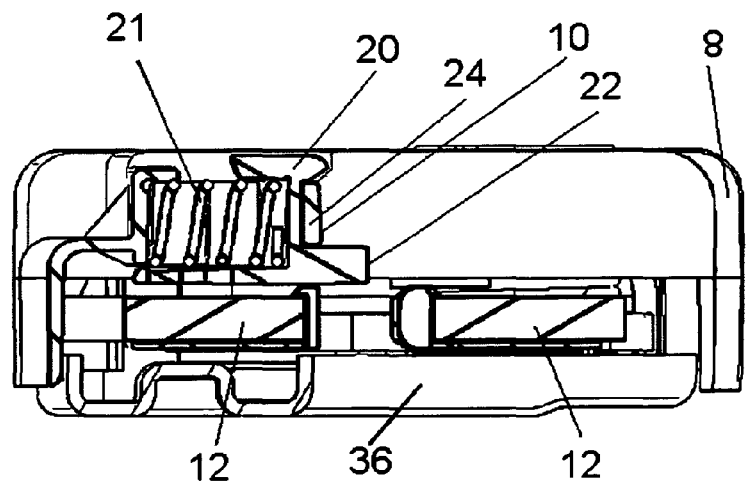
FIG. 6 is a cross-section through the latch according to FIG. 2 in the locked state along line VI-VI.
Figure 7:
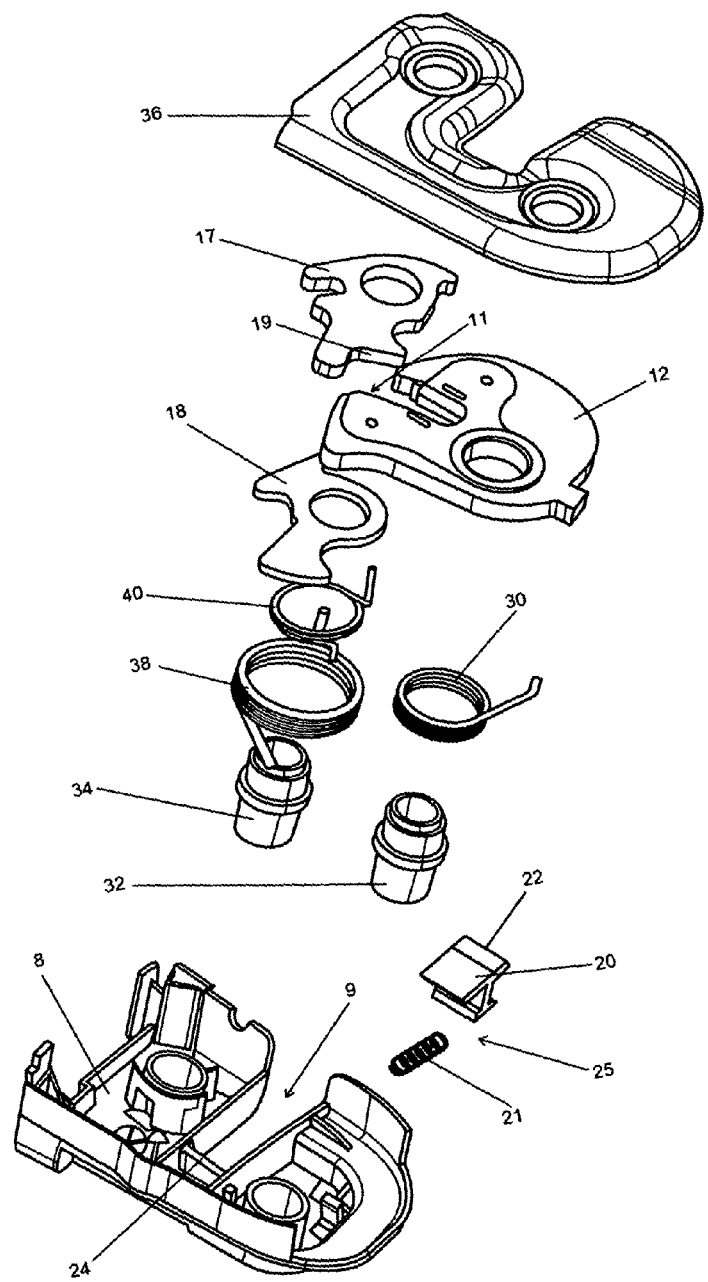
FIG. 7 is an exploded view of the latch according to FIG. 2.

FIG. 6 is a cross-section through the latch 5 in the locked state along the line VI-VI in FIG. 2. The closure bolt is not illustrated in this instance. This means that, in the illustration shown in FIG. 6, the latch 5 is locked but there is no closure bolt in the receiving member 9.

The resilient element 21 is clamped between the housing 8 of the latch 5 and the sliding ejection member 20 and presses the sliding ejection member 20 in the illustration shown here against a stop 24 which the sliding ejection member 20 engages round at two sides. The stop 24 is constructed in the manner of a web integrally with the housing 8 and forms the base 10 at the side facing away from the resilient element 21.

The sliding ejection member 20 comprises two arms with which it engages round the stop 24, one arm, in this instance the arm facing the detent 12, being constructed so as to be longer than the other arm facing away from the detent. At the end of the longer arm facing away from the resilient element 21, a contact face 22 is provided.

In the illustration shown, the longer arm protrudes with the contact face 22 beyond the base 10 into the receiving member 9.

The resilient element 21 is constructed in this instance as a cylindrical helical spring. The sliding ejection member 20 has, at the side thereof facing away from the stop 24, a cylindrical recess in which the resilient element 21 is fitted.

In the ejection position, the closure bolt 7 is introduced into the receiving member 9 of the latch 5 and touches the contact face 22 of the sliding ejection member 20. The resilient element 21 presses the sliding ejection member 20 against the stop 24 and at the same time the contact face 22 against the closure bolt 7.

If the backrest 3 is now pressed into the position for use, the closure bolt 7 presses on the contact face 22 of the sliding ejection member 20, whereby the resilient element 21 is compressed. The sliding ejection member 20 moves in this instance a maximum distance until the closure bolt 7 abuts the stop 24 and consequently the base 10. Also in the position for use, the resilient element 21 presses the sliding ejection member 20 with the contact face 22 against the closure bolt 7.

If the latch 5 is unlocked in the position for use, the detent 12 releases the closure bolt 7. The resilient element 21 expands and acts on the sliding ejection member 20. The contact face 22 of the sliding ejection member 20 then presses the closure bolt 7 away from the base 10 until the ejection position of the backrest 3 is reached.

LIST OF REFERENCE NUMERALS

1 Seat part
2 Travel direction

3 Backrest
4 Locking device
5 Latch
6 Vehicle structure
7 Closure bolt
8 Housing
9 Receiving member
10 Base
11 Functional face
12 Detent
13 Detent axis
14 Hook-like aperture
16 Catch element axis
17 Catch element
18 Clamping element
19 Catch face
20 Sliding ejection member
21 Resilient element
22 Contact face
24 Stop
25 Ejector
30 Detent spring
32 First bearing pin
34 Second bearing pin
36 Cover
38 First rotary spring
40 Second rotary spring

The invention claimed is:

1. A latch for a vehicle seat, comprising:
a detent which is pivotable about a detent axis between a release position and a locking position, for co-operating with a closure bolt or a curved closure member; and
an ejector having a resilient element which is arranged in a housing of the latch,
wherein the ejector with the resilient element which is pretensioned is capable of being brought into abutment with the closure bolt or curved closure member,
wherein the ejector has a sliding ejection member which is acted on by the resilient element,
wherein the sliding ejection member comprises two arms, one arm being constructed so as to be longer than the other arm, and a contact face being provided at an end of the longer arm facing away from the resilient element.

2. The latch as claimed in claim 1, wherein the housing of the latch has a receiving member with a slot, one end of the receiving member is open in an outward direction and the other end of the receiving member is closed with a base.

3. The latch as claimed in claim 2, wherein the closure bolt is introducible, transversely relative to the longitudinal extent thereof, into the receiving member and is engagable by the detent at a side of the closure bolt facing away from the base.

4. The latch as claimed in claim 1, wherein the detent is acted on by a resilient force of a detent spring, which produces a torque which acts on the detent in the unlocking direction.

5. The latch as claimed in claim 1, wherein the resilient element is constructed as a pressure spring and is supported on the housing of the latch, the resilient element being clamped between the housing and the sliding ejection member.

6. The latch as claimed in claim 1, wherein the resilient element is constructed as a cylindrical helical spring.

7. The latch as claimed in claim 1, wherein the sliding ejection member has a cylindrical recess, in which the resilient element is fitted.

8. The latch as claimed in claim 1, wherein the sliding ejection member engages round a stop at two sides.

9. The latch as claimed in claim 8, wherein the stop is constructed integrally with the housing and forms the base.

10. The latch as claimed in claim 1, wherein the longer arm of the sliding ejection member protrudes with the contact face beyond the base into a region of a receiving member.

11. A vehicle seat, in particular a motor vehicle seat, having a latch as claimed in claim 1.

12. The vehicle seat as claimed in claim 11, comprising:
a backrest which is pivotable relative to a vehicle structure from a position for use into a non-use position and which is lockable in the position for use,
wherein the latch is connected to the backrest, and
wherein the detent, when the backrest is in the position for use, is in locking engagement with the closure bolt or the curved closure member of the vehicle structure,
wherein the unlocked backrest is pivotable by a specific extent from the position for use into an ejection position by the ejector,
wherein, when the backrest is in the position for use with a pretensioned resilient element, the ejector is in abutment with the vehicle structure or the closure bolt or curved closure member.

13. The vehicle seat as claimed in claim 11, wherein a pivot movement of the backrest from the ejection position into the position for use is counteracted by a force which is applied by the resilient element and which corresponds to or is greater than a force acting on the backrest in the direction toward the position for use owing to an inherent weight of the backrest.

* * * * *